July 31, 1934. H. W. BUHLER Re. 19,257

MOLDED TRIMMING

Original Filed June 15, 1928

Inventor:
Henry W. Buhler
by Fowler, Cushman & Woodbury
his Attorneys

Reissued July 31, 1934 Re. 19,257

UNITED STATES PATENT OFFICE 19,257

MOLDED TRIMMING

Henry W. Buhler, Gloucester, Mass.

Original No. 1,820,934, dated September 1, 1931, Serial No. 285,640, June 15, 1928. Application for reissue June 6, 1934, Serial No. 729,250

25 Claims. (Cl. 96—26)

This invention relates to a molded trimming, an elongate strand or strip structure suitable for use as an architectural or upholstery element, or as a core giving form to an encasing tubulature, or fitting a slotted trimming, respectively providing a decorative ultimate surface or a seat for the elongate strand or strip of this invention.

The motor-car body, railway and other passenger vehicle building and the house and furniture building industries find increasing need for strip-form molded trimmings, both for exterior and for interior use in the bodies of cars or carriages, as well as for such purposes as providing glass-retaining mouldings on or stops and packings for window or door closures, providing edge or seam covering trimming for upholstery, and providing surface relief for decoration or rainwater flow directors, for examples only, for the exterior surfaces. These industries principally rely for these purposes on cloth or artificial leather or sometimes metal tubulatures, strip pipings, or mounting bases for such molded trimmings now appearing in considerable quantities interiorly or exteriorly of the vehicle body, the interior trim of rooms in houses, or the trim for cabinet work, furniture and other household utilities.

For these uses this invention provides a molded trimming of a reliably constant cross-sectional form, preferably externally covered with a textile fabric having transverse flexibility to bend about a narrow angle in the direction of its width and in the direction of its thickness, but adapted to resist deformation either of its cross-sectional shape or of its dimensions of width or thickness, and in a preferred form provided with a longitudinal seat for the heads of nails, tacks, screws, or other fasteners, by which the molded trimming is attached to the thing of which it is to become a part, either for some functional utility or for decoration. The present invention is not primarily concerned with the exterior covering, or any supporting or confining metallic or other channel in which the molded strip of the invention may be included, one characteristic of the invention being that it provides a shape for a filling or inclusion indifferently applicable to any kind of channel or tubulature relied upon for the exterior surface of the moulding or trim, stop or abutment for which the device is used.

The invention will now be explained by description of preferred species only, by way of illustration of the genus or class of such devices constituting the invention.

In the accompanying drawing.

Figure 1:
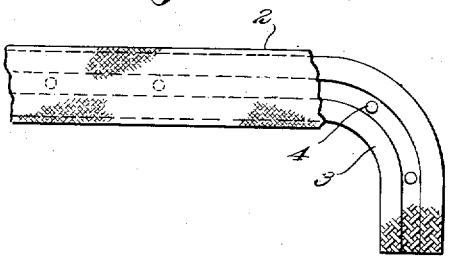
Fig. 1 is a plan view of an applied completed strip.

Referring now to Fig. 1, the core 1 of a typical instance of this manufacture may in use be entered into any appropriate cover or sheath 2, for example a braided or circular-woven tubulature of hard elastic yarns, for example mohair. To stuff such a tubular covering as the textile tubulature 2 and cause it to retain its form, the core 1 is entered into it during or after making, and the covered trimming laid to position, including such short bends or turns 3 as the flexibility of the cover or sheath will permit, and tacked or nailed through at 4. The described kind of covering sheath 2 permits the heads of nails to pass through its texture, which will close over the nail head. But the core 1 may be provided with any kind of sheath, and, for example, if the structure is an exterior structure for an automobile body, the core 1 and cover 2, or the core 1 only, may very well be used merely to fill the open exterior portion of a channel of metal, itself fastened to the car body.

Figure 4:
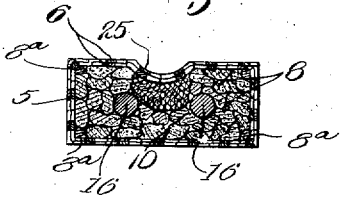
Figure 5:
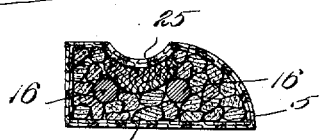

Such a core as 1 covered with cloth, artificial leather, or any other suitable covering, may be relied upon for such a structural adjunct as a beading to hold in glass, as a stop in a framed aperture to hold in window or door frames, or as a moulding abutment against which a hinged door or window comes to rest. For these uses the core may have such a form as that typically shown in Fig. 3, which is in cross section a modified quadrant of a circle; or in Fig. 4, in which the cross section is rectangular; or in Fig. 5 or Fig. 6, in which the cross section is rectangular on one edge and rounded on the other. In any of these cases, the ultimate exterior surface, if any, being variable, is not shown.

Figure 7:
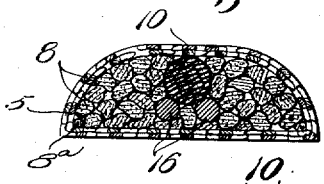
Figure 9:
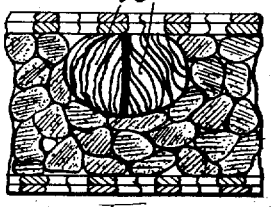
Fig. 9 is a cross section of one of the molded cores before final treatment, showing it as a modification of a plurality of strands 10.
Figure 8:
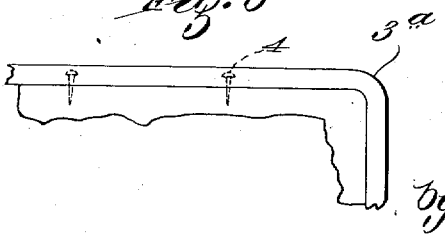
Fig. 8 is an elevation of a molded trimming applied by bending in the direction of its lesser thickness.

Whatever the form of the device in cross section, the present invention contemplates a construction made by textile methods and preferably comprising a composite core 1 having an exterior sheath constructed of a plurality of preferably uniform strands 6, these strands being so laid on the remainder of the core 1 as to impose no inhibition to lateral transverse bends of the kind indicated in Fig. 1, or at $3^a$ in Fig. 8. The core covering 5 to meet these conditions, although it may be made otherwise, is preferably braided from yarns spun from uniform strips of tough paper, such yarns being useful for many purposes for which cotton and other more usual textile fibers are employed and being hereafter included with such other materials under the general designation of textile strands. One reason for the preference of the braided structure for the core cover lies in the characteristic of a braid made by machine methods to resist elongation by compression of what is included in the area braided around, and in the further characteristic of a braided structure of adaptability to be conformed to a particular cross section at the beginning of its concatenation or weaving together by the operation of braiding carriers, the shape of the fabric being controlled by a throat, guide or die having a hole in it of the shape desired for the braid. By braiding through such a throat or templet, enough of the longitudinal yarns of the braid exactly to accommodate the final position of the braided yarns in interwoven and surrounding relation to the various shapes desired for the relatively incompressible core may be provided with accuracy, if, as is the recommended case, the strands 6 are themselves of rigid uniformity, having the same weight, the same mass, the same twist, the same diameter and the same density per unit length. The braided covering 5 imposes no limitation whatever on retention of shape under moulding pressure, such as may be later exerted on the braided cover 5 and its inclusions. For these reasons, the approximate form of the typical cross sections of Figs. 2 to 7, for example, may be imposed in a braiding machine and a later molding operation may be relied upon exactly to conform the cross-sectional area of the completed core, including its covering 5, by compression between rolls, in a flaring die, or between a die and one or more rolls cooperating together.

The cover of the core 1 is filled by including in it longitudinal strands of filler strand material. Merely for the duty of providing a flexible, relatively incompressible filling, I am aware of no more satisfactory substance than soft spun yarns of hard paper, such as kraft paper so-called. Kraft paper is a trade-name for a thin, tough and flexible paper made of inherently strong fibers, which have been subjected to no treatment likely to injure their tensile strength. Such papers are readily spun to standard sizes of yarns by the wet method, and, starting from uniform strips, the dimensions, longitudinal elasticity, lateral compressibility and constancy of weight per unit length of such yarns are extremely reliable. When making such shapes as those indicated, which are typical of many other useful shapes, it is preferred to fill the templet or throat of the braiding machine making the cover 5 with a precalculated core, of whatever strand material, exactly corresponding under a given state of compression to the void in the cover 5.

For purposes now to be mentioned, the included stuffing comprised of longitudinally extending stuffings, preferably, for example, may have other elements of a different character, and of course it will be understood that in many situations, as shown for instance in Fig. 7 at $8^a$, in many cases it may be desirable that not all of the stuffer yarns 8 shall be of the same size, those shown at $8^a$ by way of illustration being intended to occupy the interior of a sharp exterior angle in the finished form of the cover 5, being, for example, relatively small and thin yarns.

In instances where it is desirable, for example, to fasten on the trimming by nails or tacks, it is preferred to provide for a seat for the head of tack or other fastener as well as to facilitate penetration by nail or tack through a less impenetrable mass than that furnished by the stuffer yarns 8. For this purpose there may be distributed in the stuffing within the cover 5 at the proper place for penetration one or more relatively soft and compressible elongate stuffers of the kind shown at 10 in Figs. 2 to 7, and 9, and characteristically comprising a bundle of soft and more penetrable fibrous material than the paper stuffer yarns 8. The preferred way of making the penetrable stuffers 10 is to gather together in a trumpet guide a series of laminations of crepe paper which may be impregnated with a suitable cement (for example a gum in a solvent) before or after making, or, to serve the same purposes, the core 10 might be a roving or bundled sliver of a cardable fiber or even a bundle of spun textile yarns. Whatever the material of which the soft stuffer 10 is composed, it should be both penetrable and compressible, to permit subsequent formation of a channel as at 25, and by preference its condition and previous or subsequent treatment should be such as to make it stiffly plastic, so that it retains the cross section imposed upon it by compression or otherwise.

Figure 2:
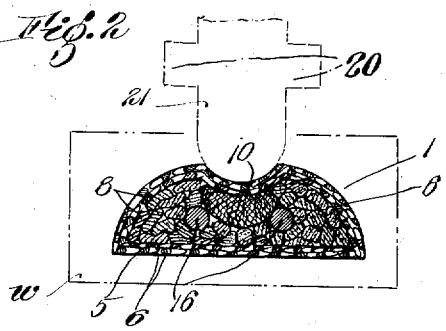
Fig. 2 is a cross section of a core suitable for the molded strip of Fig. 1.
Figure 6:
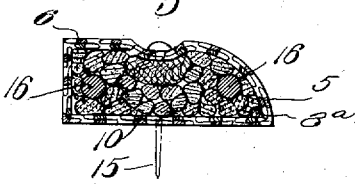

For some kinds of difficult usages to which trimming strips are subject, it is desirable to insure that the headed tacks or nails 15, Figs. 2 and 6, for example, can not have their heads pulled through the core 1. On the other hand, it should be possible to drive the nails or tacks so deeply as to bury their heads below the outer layer conforming to the boundary and cross section of the core strip. It is also most desirable that the stuffer structure include a flexible form retaining element such as a relatively flexible metal longitudinal strip or wire, preferably an annealed soft iron wire or wires. For example, a pair of wires 16, 16, may be distributed to lie on either side of the soft core 10, and this structure, without substantial variations, may be used in such forms and cross section as those illustrated in Figs. 3, 4, 5 and 7. The flexible but relatively stiff longitudinal inclusions in the core are useful to prevent a form once imposed on the molded trimming from spontaneous change, which is of importance in forming the molded trimming to curvatures such as at 3 or at $3^a$ in Fig. 8, enabling the trimming to be formed in place and subsequently fastened down by nailing. Or, as illustrated in Fig. 6, or in Fig. 3, the strips or wires 16 may be used relatively near the outer faces of the cross-sectional configuration in order to provide special resistance to expected stress against those faces of the moulding or trimming.

Figure 3:
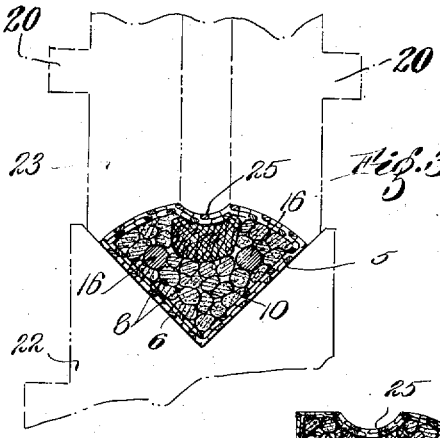
Figs. 3, 4, 5, 6 and 7 are views similar to Fig. 2, showing molded cores of different shapes in cross section.

In any instance of the manufactures represented by way of illustration of the invention, it will be understood that the steps of the formation preferably comprise the making of a braided shape, including the stuffer members 8, 10 and 16, or any one or more of these of approximately the desired cross section by braiding through a properly formed throat or template; and thereafter to impose upon this preformed braided shape an accurate cross section, preferably by compression, for example, in a die diagrammatically indicated in dotted lines at 20 in Fig. 2, with which there may cooperate a compression roll 21, or, as shown in Fig. 3, the entire shape may be imposed by a pair of rollers 22, 23, elements of whose surfaces define respectively two or more faces of the completed shape.

In Figs. 2 to 6 the cross-sectional figure shown includes a longitudinal depression 25, preferably formed after assembly by the action of the dies or rolls. This depression, to accommodate the heads of tacks, or receive the edge of a glass panel, is permitted to be made by the relatively compressible nature of the stuffers 10.

It will further be understood that retention of the molded shape may be assisted by an impregnation prior to die forming either by dies or rolls with a suitable cementitious plastic impregnant. Such an impregnant may comprise any suitable rubber cement; for example, a rubber cement compounded of rubber latex, with or without an included filler, and a suitable solvent, or a rubber cement comprising about 20% of rubber compound, including filler, if any, and about 80% of a volatile, such as gasoline. In practice the completed braids are charged with the impregnant by running them repeatedly through a tank of the cementitious substance, excess is removed by scraping; and the core is then run in the air with or without heat for a sufficient distance to dry off a portion of the cement solvent; and the prepared strip is then subjected to the action of dies such as those illustrated in Figs. 2 and 3. Preferably the dies are cold, but with some varieties of impregnants it may be desirable to heat them. At high speeds friction may be relied upon to keep the dies or rolls properly warm for compression to molded shape, whether the material is dry or impregnated.

I claim:

1. Molded trimming which is strong, flexible and capable of bending sharply without breaking and of retaining its shape after bending comprising an aggregate of longitudinally extending stuffer strands and a surrounding cover of concatenated strands, the strands of each set being characterized by uniformity of mass, tensile elongation and lateral compressibility, concatenated to conform to a non-circular cross section.

2. Molded trimming comprising an elongate strip of longitudinally extending stuffer elements and a surrounding cover of concatenated strands each characterized by uniformity of mass, tensile elongation and lateral compressibility, concatenated to conform to a non-circular cross section, the stuffer elements including a relatively soft and penetrable longitudinal stuffer strand.

3. Molded trimming which is strong, flexible and capable of bending sharply without breaking and of retaining its shape after bending comprising a plurality of longitudinally extending fibrous stuffer strands and a surrounding cover of concatenated strands, the strands of each set being characterized by uniformity of mass, tensile elongation and lateral compressibility, concatenated to conform to a non-circular cross section, and a flexible metallic strand included with the fibrous stuffer strands.

4. Molded trimming comprising an elongate strip of longitudinally extending stuffer elements and a surrounding cover of concatenated strands each characterized by uniformity of mass, tensile elongation and lateral compressibility, concatenated to conform to a non-circular cross section, the stuffer elements including a relatively soft and penetrable longitudinal stuffer strand, and a flexible metallic strand.

5. Molded trimming comprising a braided cover of twisted paper strands of substantially uniform cross section, longitudinally extending stuffers having in the aggregate a constant cross section in respect to mass per unit length and compressibility, certain of said stuffers being more compressible than others.

6. Molded trimming comprising a braided cover of moldable textile strands, longitudinally extending stuffers having in the aggregate a constant cross section in respect to mass per unit length and compressibility, certain of said stuffers being more compressible and more penetrable than others.

7. Molded trimming comprising a braided cover of moldable textile strands, longitudinally extending stuffers having in the aggregate a constant cross section in respect to mass per unit length and compressibility, certain of said stuffers being more compressible and certain of said stuffers being more penetrable than others.

8. Molded trimming comprising a braided cover of moldable textile strands, longitudinally extending stuffers having in the aggregate a constant cross section in respect to mass per unit length and compressibility, certain of said stuffers being more compressible and more penetrable than others, the trimming having a non-circular cross section.

9. Molded trimming comprising a braided cover of moldable textile strands, longitudinally extending stuffers having in the aggregate a constant cross section in respect to mass per unit length and compressibility, certain of said stuffers being more compressible and more penetrable than others, the strand having a molded cross section including a longitudinal depression opposite a compressible stuffer.

10. Molded trimming comprising a braided cover of moldable textile strands, longitudinally extending stuffers having in the aggregate a constant cross section in respect to mass per unit length and compressibility, certain of said stuffers being more compressible and more penetrable than others, and certain of said stuffers being metallic and relatively rigid, whereby to provide for retention of bent forms of the trimming.

11. Molded trimming comprising a braided cover of moldable textile strands, and longitudinally extending stuffers having in the aggregate a constant cross section in respect to mass per unit length and compressibility, the structure being interpenetrated by a cementitious plastic adhesive and having a non-circular cross section comprising a longitudinal compressed depression.

12. Molded trimming comprising a surrounding covering of molded textile strands regularly concatenated into a tubular fabric, and longitudinally extending stuffer strands of constant aggregate volume, weight and compressibility at any cross section, at least one of the stuffer strands being more readily capable of lateral compression than certain other stuffer strands although retentive of its compressed form, the trimming having an exterior longitudinal depression corresponding to the position of said more compressible strand or strands.

13. Molded trimming comprising a surrounding covering of molded textile strands regularly concatenated into a tubular fabric and longitudinally extending stuffer strands of constant aggregate volume, weight and compressibility at any cross section, one at least of the stuffer strands being more readily capable of lateral compression than certain other stuffer strands although retentive of its compressed form, the trimming having a longitudinally extending compressed groove in its outer covering and a correspondingly compressed internal stuffer.

14. Molded trimming comprising a surrounding covering of molded textile strands regularly concatenated into a tubular fabric, and longitudinally extending stuffer strands of constant aggregate volume, weight and compressibility at any cross section, one or more of the stuffer strands being stiffly plastic and more readily capable of lateral compression than certain other stuffer strands although retentive of its compressed form, and one or more of said stuffer strands being metallic and flexible, the trimming having exterior longitudinal depression corresponding to the position of said more compressible strand or strands.

15. Method of making a molded trimming comprising as a step braiding a cover of uniform strands about a stuffer aggregate of constant mass, density and compressibility, the braiding strands and stuffer being held to a non-circular cross section during assembly of stuffer and cover, and thereafter subjecting the trimming to a molding pressure accurately to conform its cross-sectional area to said non-circular cross section.

16. Method of making a molded trimming comprising as a step braiding a cover of uniform strands about a stuffer aggregate of constant mass, density and compressibility, the braiding strands and stuffer being held to a non-circular cross section during assembly of stuffer and cover, impregnating the trimming with a cementitious impregnant, and thereafter subjecting the trimming to molding pressure accurately to conform its cross-sectional area to said non-circular cross section.

17. Method of making a molded trimming comprising as a step braiding a cover of uniform strands about a stuffer aggregate of constant mass, density and compressibility, the braiding strands and stuffer being held to a non-circular cross section during assembly of stuffer and cover. impregnating the trimming with a cementitious impregnant containing a volatile solvent, evaporating a portion of the solvent, and thereafter subjecting the trimming to molding pressure accurately to conform its cross-sectional area to said non-circular cross section.

18. Art of making a molded trimming comprising the steps, braiding a cover around an aggregate of longitudinally extending stuffers, one at least of which is relatively more compressible than others, and thereafter subjecting the trimming to local longitudinal compression to form a groove in the braided cover by compressing the cover and said more compressible stuffer.

19. Moldable trimming comprising a set of longitudinally extending strands, one at least of said strands consisting of laminated crepe paper impregnated with a binding adhesive agent and a wrapper comprising twisted paper strands, said moulding being of substantially constant non-circular cross section in respect to mass per unit of length and compressibility.

20. Molded trimming which is strong, flexible and capable of bending sharply without breaking and of retaining its shape after bending, said trimming including a compressible stuffer comprising soft, cellulosic sheet material gathered together to provide longitudinally extending laminations, and a surrounding tubular cover of interbraided spun textile strands, said textile strands being characterized by uniformity of mass, tensile elongation, and lateral compressibility per unit of length, the stuffer being likewise characterized by substantial uniformity of mass, tensile elongation, and lateral compressibility per unit of length, the trimming having a permanent molded non-circular cross section of a contour which is different from that of the cover at the completion of the braiding operation.

21. A moldable trimming comprising a stiffly plastic stuffer strand composed of soft and compressible cellulosic sheet material disposed in longitudinally extending laminations, a tubular cover enclosing said strand, said cover comprising concatenated spun textile yarns, and a binding adhesive agent, comprising a rubber compound, impregnating the stuffer strand, said trimming having a permanent molded non-circular cross section of a different contour from that of the stuffer strand prior to enclosure in the cover, the trimming being substantially constant in respect to mass per unit of length and in respect to compressibility per unit of length.

22. Method of making a molded trimming comprising as a step braiding a cover of uniform textile strands about a stuffer comprising soft, cellulosic sheet material gathered together to form a plurality of longitudinally extending laminations, said stuffer being of substantially constant mass, density and compressibility, the braiding strands and stuffer being held to a predetermined cross section during assembly of stuffer and cover, and subjecting the assembled material to molding pressure thereby to impose upon the preformed shape an accurate predetermined permanent non-circular cross section different from that produced in the cover braiding operation.

23. Method of making a molded trimming comprising as steps braiding a cover of uniform spun textile yarns about a stuffer comprising soft, cellulosic sheet material gathered together to form a plurality of longitudinally extending laminations, said stuffer being of substantially constant mass, density and compressibility, the braiding strands and stuffer being held to a non-circular cross section during assembly of stuffer and cover, treating the assembled material with a fluid reagent, and subjecting the treated material to molding pressure such as to change its cross-sectional shape from that imposed during assembly of the stuffer and cover.

24. Method of making a molded trimming having a stuffer and a cover therefor, said method comprising as a step gathering together soft-cellulosic sheet material to form a penetrable and compressible laminated stuffer strand of constant mass, density and compressibility per unit of length, braiding a tubular cover of uniform textile yarns to enclose the stuffer strand, the braided yarns and strand being held to a predetermined cross section during assembly of strand and cover, impregnating the trimming with a rubber latex solution, partially drying the impregnated material, and thereafter subjecting the trimming to molding pressure thereby to change the cross-sectional shape of said laminated stuffer strand.

25. Method of making stiffly plastic molded trimming including as steps forming a stuffer comprising an elongate lamellar stuffer strand of soft, compressible, fibrous, cellulosic material, said strand being of substantially constant mass, density and compressibility per unit of length, encasing said stuffer in a tubular cover of uniform textile yarn, and treating the incomplete trimming with fluid rubber latex and subjecting the material to molding pressure so applied as to compress and vary the cross-sectional shape of its constituent parts and accurately to conform the trimming to a predetermined, permanent, non-circular cross section.

HENRY W. BUHLER.